Sept. 20, 1966  N. HEPNER  3,273,793
ACCOUNTING MACHINE PERFORATOR CONTROL SYSTEM
Filed April 7, 1965  8 Sheets-Sheet 1

INVENTOR.
NEAL HEPNER.
BY
Wallace P. Lamb
ATTORNEY.

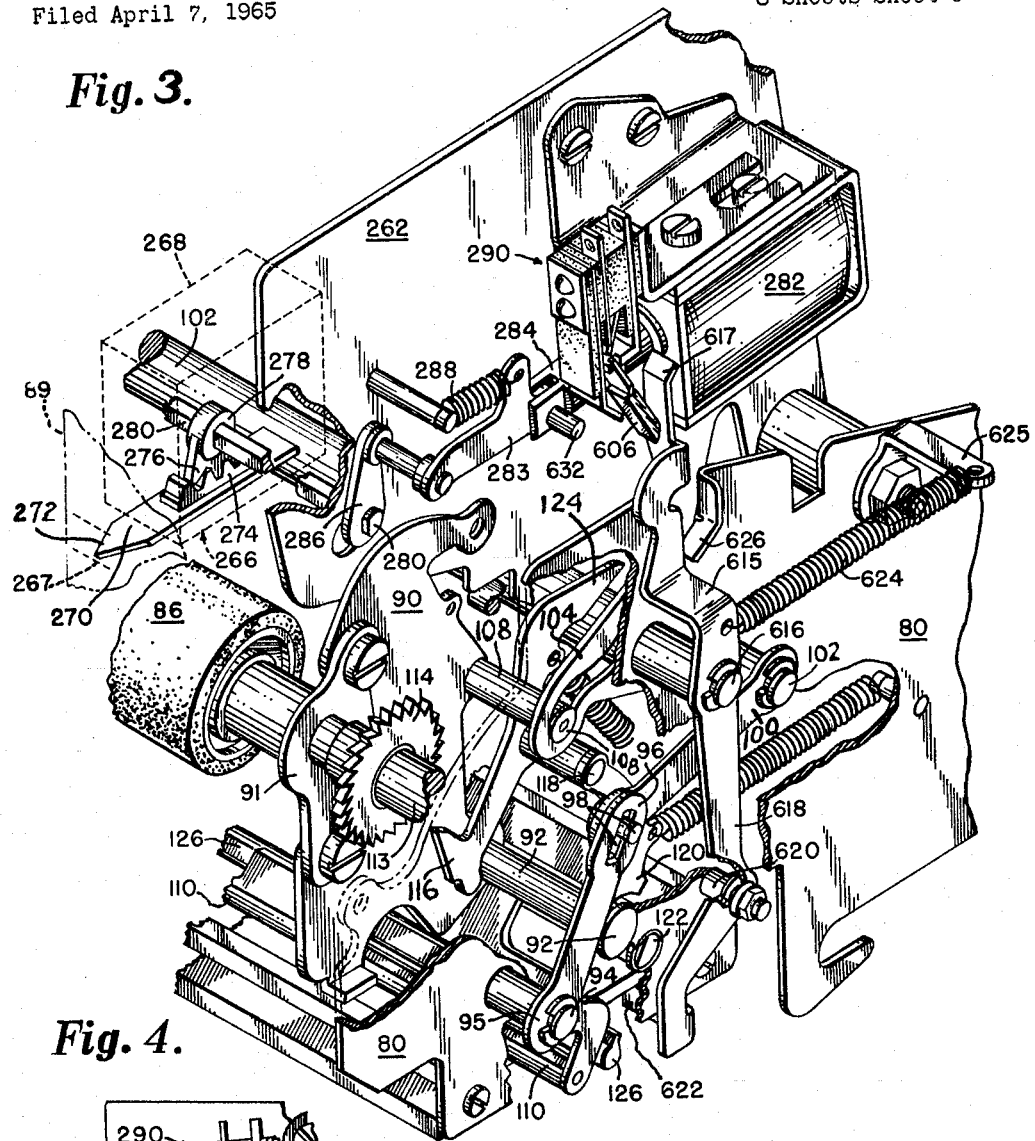

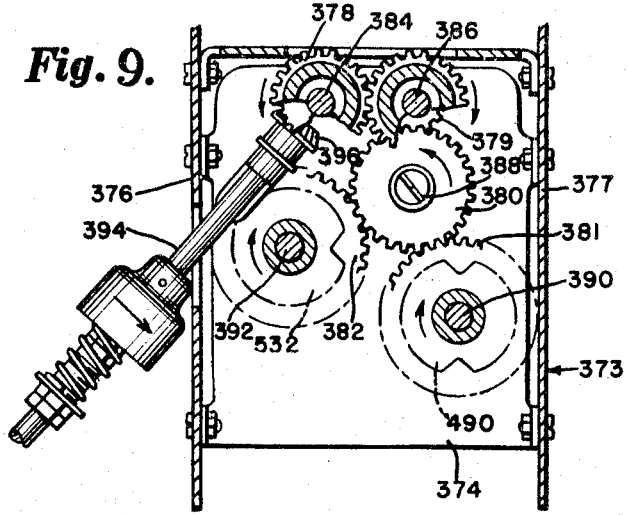
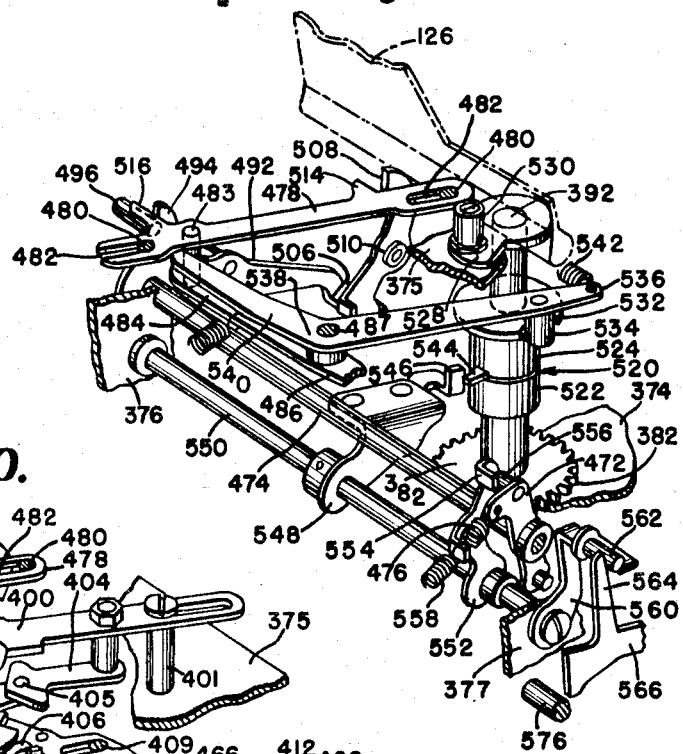
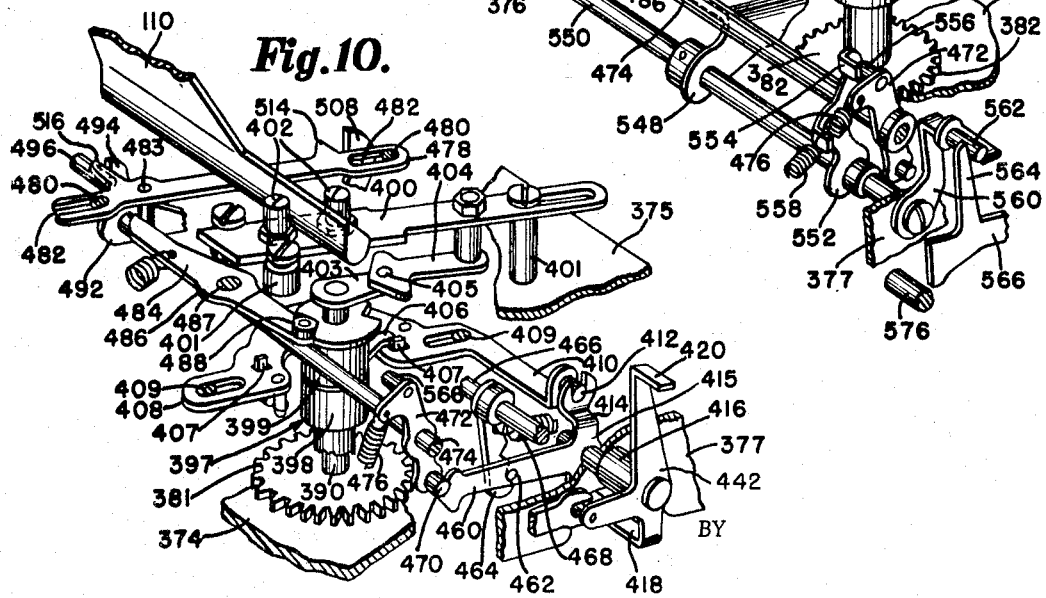

United States Patent Office 3,273,793
Patented Sept. 20, 1966

3,273,793
ACCOUNTING MACHINE PERFORATOR CONTROL SYSTEM
Neal Hepner, Birmingham, Mich., assignor to Burroughs Corporation, Detroit, Mich., a corporation of Michigan
Filed Apr. 7, 1965, Ser. No. 446,280
10 Claims. (Cl. 235—60.51)

This invention relates generally to cyclically operable accounting machines for processing record sheets and particularly to a control system for controlling the operation of a perforator for marking the last line of print on a record sheet.

It is an object of the present invention to provide for a cyclically operable accounting machine having a perforator operable to perforate a record sheet as a designation of the last line of print thereon, an improved perforator control system in which a control member, responding to certain machine functions, effects activation of the perforator once for each line of posting operations.

Another object of the invention is to provide for an accounting machine having a platen movable from a retracted sheet receiving position to a sheet holding printing position, an improved control system for effecting operation of a perforator to mark the last line of print on a sheet and operated by the platen moving mechanism to set a control member of the system in effective position on retraction of the platen and to render the control member ineffective on movement of the platen to printing position.

Another object of the invention is to provide for an accounting machine having a rotatable line spacing platen, an improved control system for effecting operation of a perforator for perforating a sheet as a designation of the last line of print thereon and operated by the line spacing mechanism to position a control member in effective position.

Another object of the invention is to provide an improved perforator control system in which selective operation of an electrically operated perforator is effected by rendering a control member effective by a machine function and ineffective by the perforating action of the perforator.

More specifically, it is an object of the invention to utilize the perforation action of an electrically operated perforator to render the perforator ineffective until either a platen retraction operation or a line spacing operation resets a perforator switch to the end of effecting a single perforating operation for each line of posting operations.

Other objects of the invention will become apparent from the following description, taken with the accompanying drawings, in which:

FIG. 3 is a fragmentary perspective view of the mechanism of FIG. 2;

FIG. 4 is a fragmentary side view of certain details;

FIG. 9 is a horizontal sectional view, taken substantially along the line 9—9 of FIG. 7;

FIGS. 10 and 11 are perspective views of the power transmission mechanism;

Figure 1:
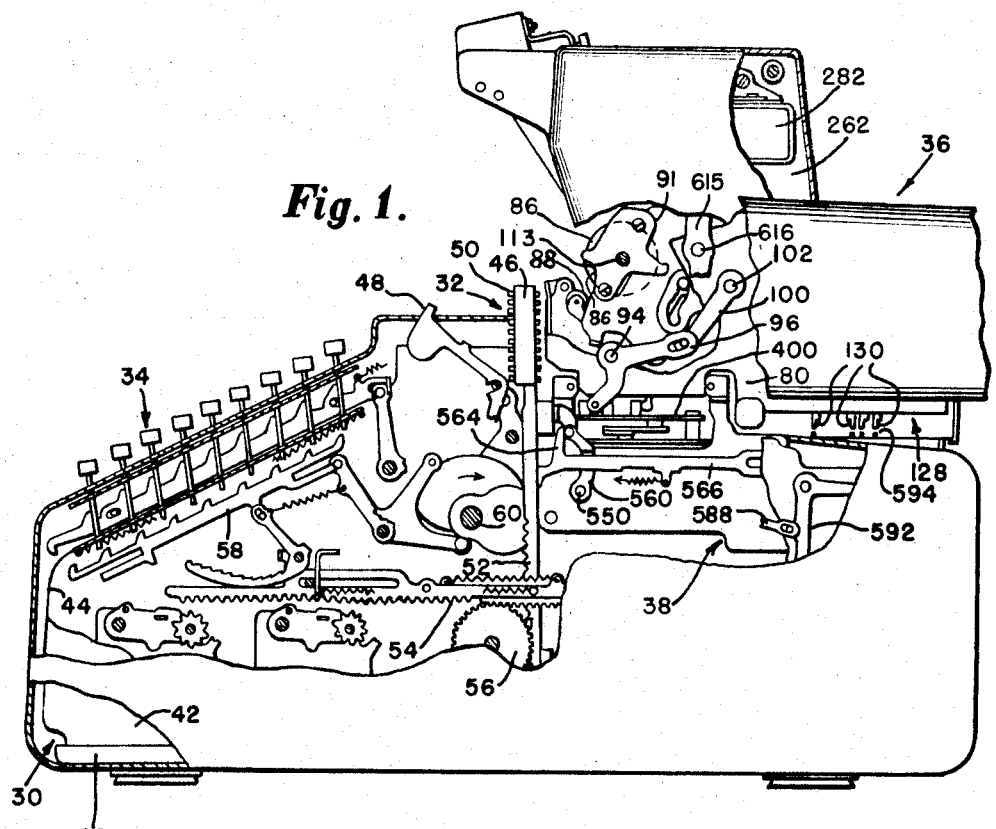
FIG. 1 is a side view, partly broken away and in section, of a cyclically operable accounting machine embodying features of my invention.

In the drawings, the invention is illustrated in connection with a cyclically operable accounting machine, such as the machine of the patent to Thomas M. Butler entitled, "Automatic Function Control Mechanism for Accounting Machines," No. 2,629,549, issued February 24, 1953. As the invention, which is the subject matter of the present application, pertains only to certain ones of the machine mechanisms, the machine has not been herein shown and described in its entirety, but for a complete understanding of the machine, reference may be had to the above mentioned Butler patent.

Referring to the drawings by characters of reference and first to FIG. 1, the accounting machine comprises, in general, a supporting member or frame structure 30, a printing mechanism 32, a keyboard 34, a paper carriage 36 and a power transmission mechanism 38. The printing mechanism 32, keyboard 34, carriage 36 and transmission 38 are mounted on the frame 30 in the usual well known arrangement, the printing mechanism 32 being located horizontally between the keyboard 34 and the carriage 36, and the transmission 38 being located directly below the carriage. The frame structure 30 is preferably mounted on a base 40 and comprises a pair of laterally spaced apart side plates 42 and 44 which are rigidly connected together by the well known cross rods.

The printing mechanism 32, FIG. 1, comprises, in general, a plurality of laterally spaced apart print heads 46, of which there is one for each denomination or columnar row of amount keys on the keyboard 34, and a like number of print hammers 48. Print elements 50 are mounted on each of the print heads 46, and the heads are affixed to the upper ends respectively of a like number of vertical bars 52 which are individually vertically movable to position key selected ones of the print elements 50, at a datum or print line. Horizontally movable amount racks 54, of which only one is shown, are individually connected to the print head bars 52 by gears 56 to raise and lower the print heads 46, the amount racks being differentially positionable in accordance with the setting of stop members 58 by the key indexing of amounts on the keyboard 34.

Extending between and journaled on the frame side plates 42 and 44 there is a cyclically operable means or main camshaft 60 from which various mechanisms of the machine are driven as will be understood from the Butler patent. The camshaft 60 is driven by a drive means or electric motor 62, FIGS. 5 and 14, which is controlled by a switch 64, operated from a motor bar 66 which is connected mechanically to the switch, as represented diagrammatically in FIG. 14. Connecting the motor drive shaft to the camshaft 60 there is a conventional one revolution clutch, FIG. 14, which is diagrammatically represented as comprising a clutch member 68, normally held disengaged by a pawl 70 which is actuated by the motor bar 66 to release the clutch at the time that the motor switch 64 is closed. A retractable stop member 72, represented as the movable core of a solenoid 74, prevents the closing of the motor switch 64 and retraction of the pawl 70.

Figure 2:
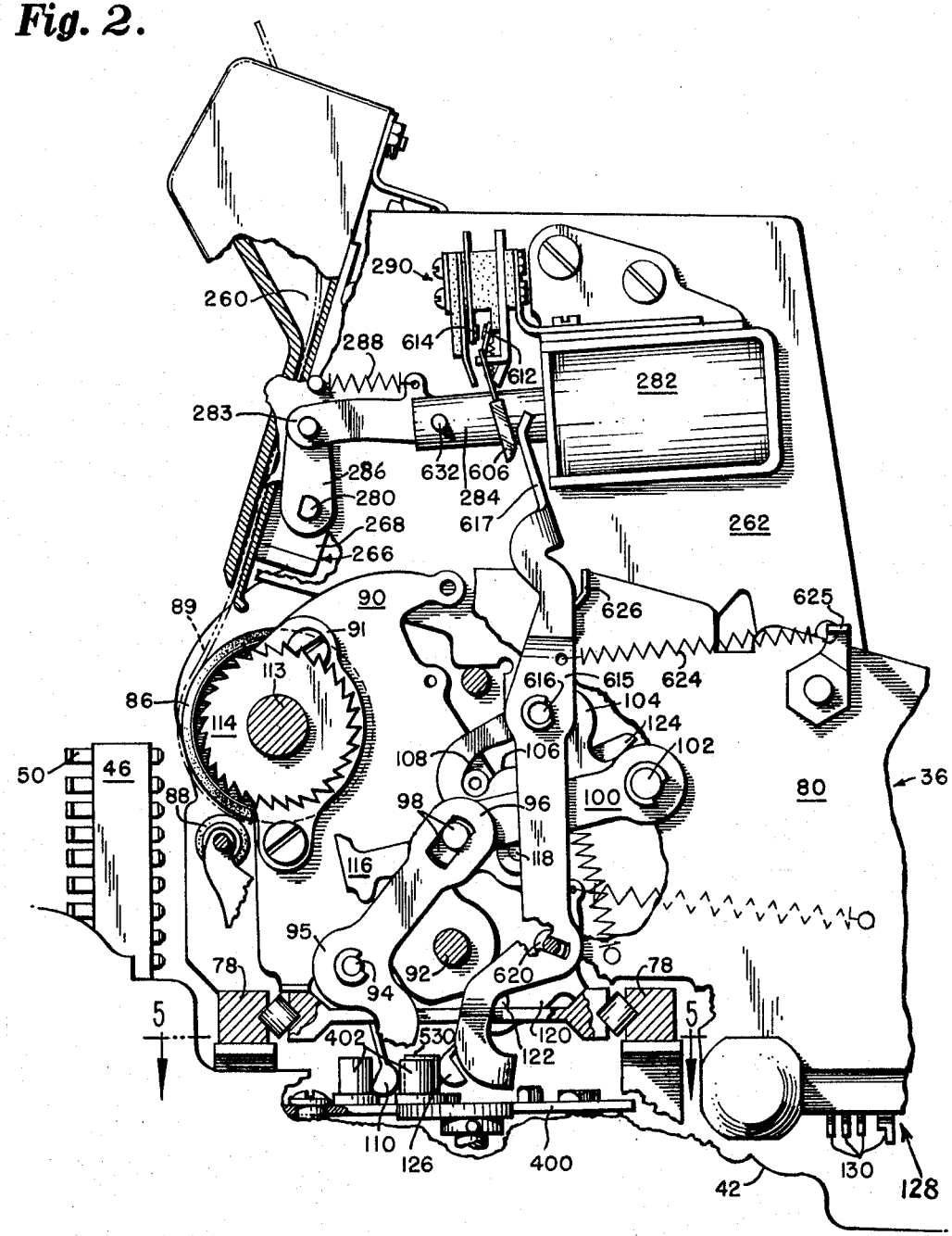
FIG. 2 is an enlarged fragmentary side view of the machine.
Figure 6:
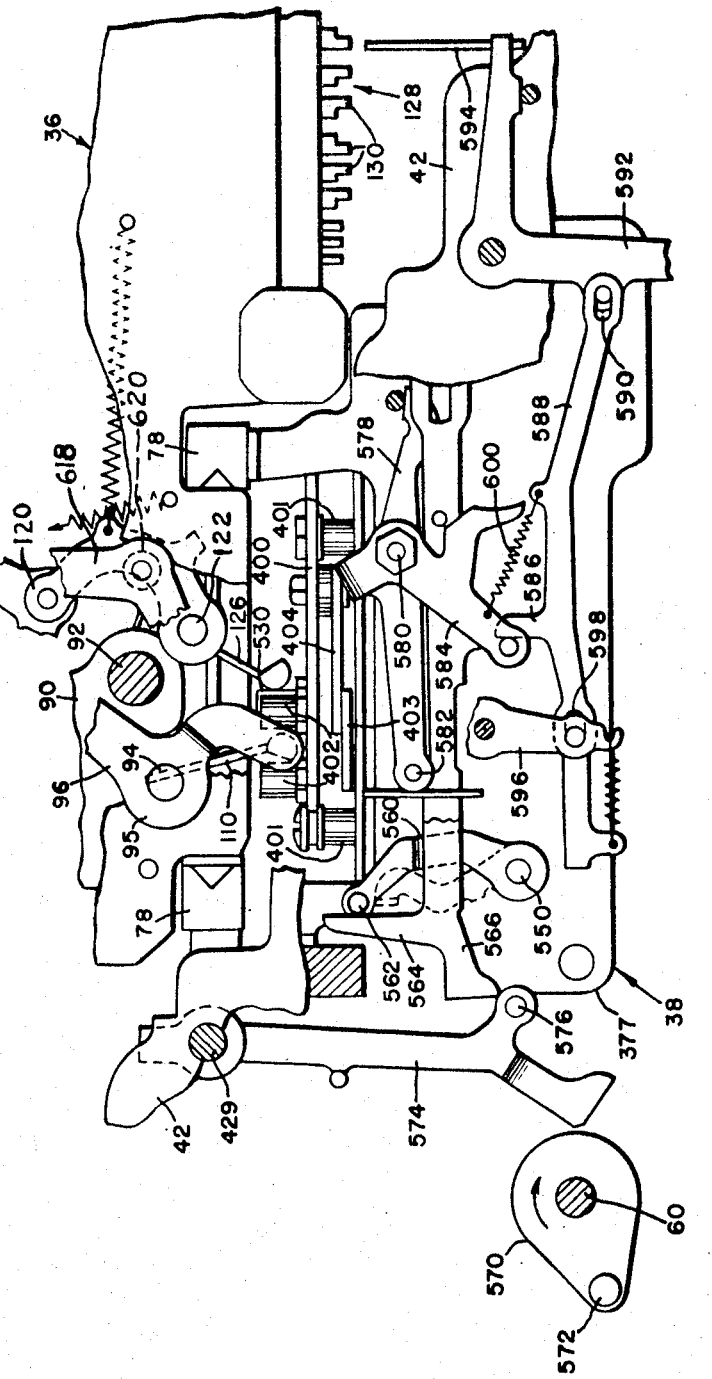
FIG. 6 is a fragmentary vertical sectional view, partly in elevation, taken substantially along the line 6—6 of FIG. 5.

The carriage 36 is mounted on guide rails 78, FIGS. 2 and 6, affixed to the machine frame side plates 42 and 44, for movement or tabulation transversely to selected columnar positions in the performance of posting operations. As is well known, listing operations may also be performed by such machines. Preferably, the carriage 36 comprises an encased frame structure having opposite side plates 80, of which only one is shown, the side plates being rigidly connected together by the usual cross rods (not shown).

A roller type platen 86 is mounted on the carriage 36 and is cooperable with pressure rollers 88 to receive and hold a record sheet 89 therebetween. As is shown more clearly in FIG. 2, the platen 86 is mounted near its ends on a pair of plate-like arms 90 by means of end brackets 91 so as to be movable between a forward printing position, engaging the pressure rollers 88, and a rearward, or so-called open throat retracted, or sheet receiving position. The arms 90 are positioned inwardly of and respectively adjacent the carriage side plates 80 on which the arms 90 are pivotally mounted by pins or stub shafts 92, FIGS. 2, 3 and 6. Below the platen 86, a rotatable shaft 94 is journaled in the carriage side plates 80 and affixed to the shaft at each side of the carriage frame there is a lever 95 having an upwardly directed arm 96. The lever arms 96 of the pair of levers 95 are respectively connected by slot and pin connections 98 to the free ends of a pair of arms 100 which are affixed to a transverse shaft 102, rotatably journaled in the carriage frame side plates 80. Also affixed to the shaft 102, there is a pair of arms 104, FIGS. 2 and 3, having each a cam slot 106 to receive a cam follower 108, carried by and secured to the platen supporting arms 90. By rotating the shaft 94 in a clockwise direction, FIG. 2, the cam arms 104 will be pivoted counterclockwise which in turn will pivot the supporting arms 90 counterclockwise, thus swinging the platen 86 from its printing position, shown in FIG. 2, to its retracted or record receiving position shown in FIG. 1. Rotation of the shaft 94 to retract the platen 86 is effected by the operation of a lever or bail 110 which is connected to the shaft and is operated from the hereinafter described power transmission mechanism 38.

To provide for the vertical line spacing of a record sheet, the platen 86 is mounted for rotation on its supporting arms 90 and at one, or the rightward end of the platen shaft, as at 113, there is an indexing mechanism which comprises the usual ratchet wheel 114 and an operating pawl 116, FIGS. 2 and 3. The ratchet wheel 114 is affixed to the platen shaft 113 and the pawl 116 is pivotally mounted intermediate its ends, as at 118, to a pawl operating lever 120 which is affixed onto a rotatable shaft 122, journaled for rotation on the carriage side plates 80. An arm 124 of the pawl 116 bears against a hub of the lever 100 to provide a fulcrum about which the pawl can be pivoted into engagement with the teeth of the ratchet wheel 114 with a compound upward and forward motion when the pawl operating lever 120 is pivoted counterclockwise. A lever or bail member 126 is operatively connected to rotate the shaft 122 and is in turn operated from the power transmission mechanism 38 in a manner hereinafter described.

Mounted on the underside of the carriage 36 there is a program device 128 for automatically controlling the opening and closing operations of the carriage platen 86 and for automatically controlling rotation of the platen 86 to effect line spacing of a record sheet by the platen when called for by the program. The program device 128 is of the well known type in which pins 130 are arranged to effect operation of the machine and this program device is shown and described in detail in the aforementioned Butler patent.

A suitable record sheet guideway 260 is mounted on and between a pair of spaced apart upper side plates 262 to guide a sheet downwardly to the platen 86. The guideway 260 terminates above the platen 86 and mounted on the back of the guideway near the lower end thereof is a sheet marker or perforator, designated generally by the numeral 266. The perforator is provided for piercing a line designating slit 267 in the sheet as a mark or representation of the last line of printing thereon. The perforator 266 includes a mounting member or body 268 which is suitably secured to the guideway 260. Slidably guided within the body 268 there is a perforator member or blade 270 having a paper piercing edge 272 at one end thereof with the blade edge horizontally disposed. The blade edge 272 is directed toward the record sheet guideway 260 wherein aligning clearance apertures are provided to receive the blade, the blade being normally retracted without the guideway. A gear rack 274 seats on and is connected to the blade 270, and a gear segment 276 is in mesh with the gear rack. The gear segment 276 is on an arm 278 which is affixed to a rotatable shaft 280 which may be journaled for rotation in the side plates 262. The shaft 280 is operatively connected to an electrically operated actuator or solenoid 282 which is mounted rigidly on the side plate 262. An extension member or link 283 is connected at one end thereof to the usual electrically operated member or armature 284 of the solenoid 282 and at the other end to an arm 286 which is affixed to the rotatable shaft 280. A return spring 288 is connected to the arm 286 and is anchored to the side plate 262. A control device, designated generally by the numeral 290 is provided to control operation of the solenoid 282, and operation of the control device is dependent upon whether a carriage platen opening and/or a line spacing operation was effected on the next preceding cycling operation of the machine, the control device being hereinafter described in detail.

Figure 5:
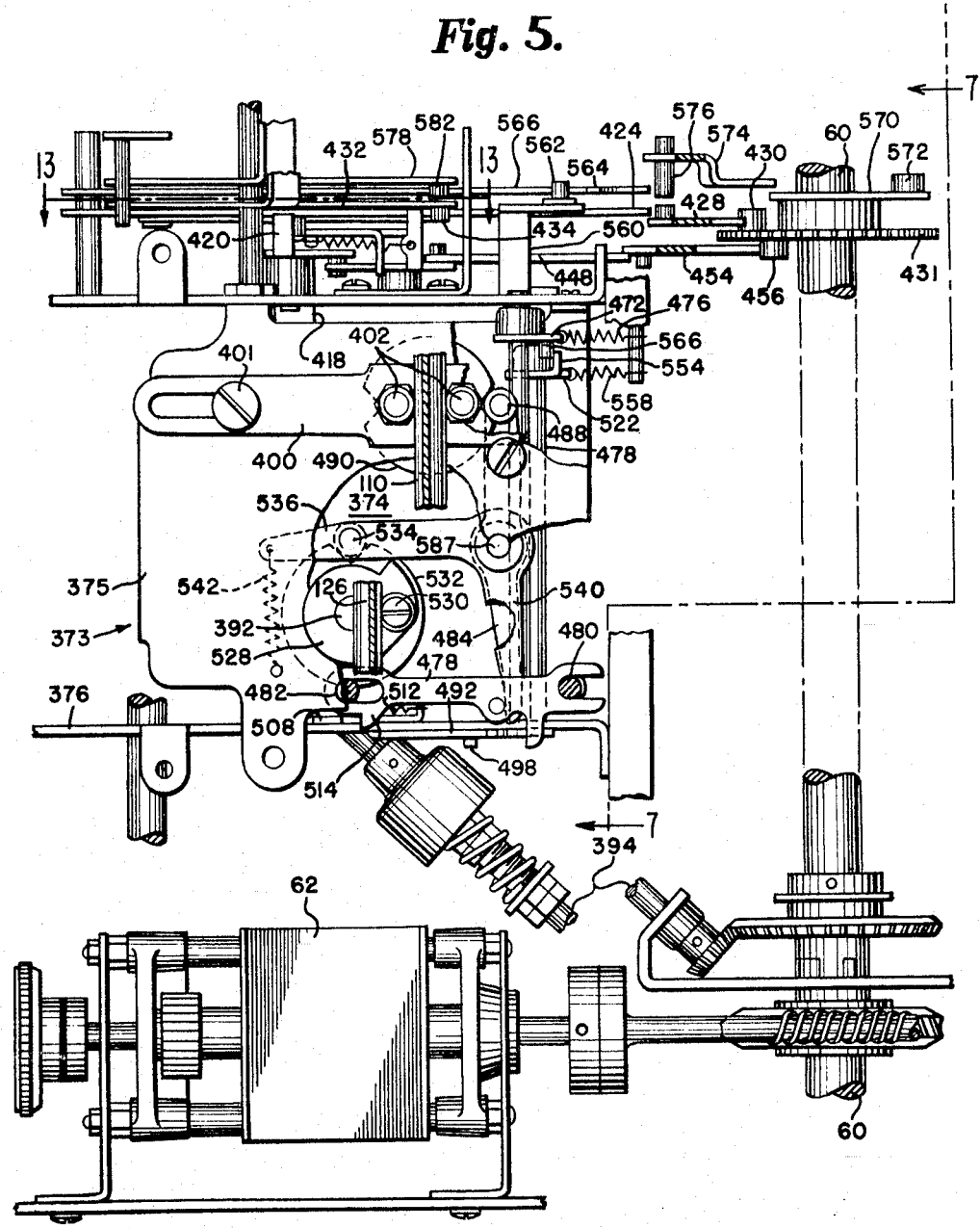
FIG. 5 is a plan view, partly broken away and in section of a power transmission of the machine, and taken substantially along the line 5—5 of FIG. 2.

Referring now to FIGS. 5 and 9, the transmission mechanism 38 comprises a housing 373 having a bottom wall 374, a top wall 375 and side walls 376 and 377. Within the housing 373, adjacent the bottom wall thereof, there is a gear train including a driving gear 378, and intermediate gear 379, an idler gear 380 and two driven gears 381 and 382. The gears 378, 379, 380, are respectively and freely mounted on vertical shafts 384, 386 and 388 which are mounted in and to the housing bottom wall 374. The gears 381 and 382 are rotatable on vertical shafts 390 and 392 respectively, which shafts are rotatable, the shafts 390 and 392 being journaled for rotation in the housing bottom and top walls 374 and 375. The gear train is driven by the motor 62, FIG. 5, from a power take-off shaft 394 which is geared to the cam shaft 60, the shaft 394 having a bevel gear 396 affixed thereto and in mesh with the gear 378 of the gear train, as shown in FIG. 9. The driven gear 381 is a part of the mechanism shown in FIG. 10 for opening and closing the carriage platen 86, and the driven gear 382 is a part of the mechanism shown in FIG. 11 for rotating the platen 86 to effect vertical line spacing of a record sheet.

Referring first to the mechanism of FIG. 10, the gear 381 is secured to the lower end of a hub of a clutch member 398 which is therefore the driving clutch member, and the clutch, designated generally by the numeral 397, includes an upper driven clutch member 399 which is affixed onto the rotatable shaft 390. The driven clutch member 399, through the upper end of shaft 390, is operatively connected to the previously described bail 110 by a shifter member or slide 400 which is slidably movable transversely of the bail, as shown in FIG. 10. The slide member 400 is slidably guided by guide members 401 which are securely mounted on the top wall 375 of the transmission housing, and carried by the slide member 400 in spaced apart relationship longitudinally thereof is a pair of abutment members or rollers 402 between which the bail 110 extends for operation by the slide. The driven clutch member shaft 399 may be connected to the slide member 400 by a pair of arms 403 and 404 pivoted together, as at 405. A clutch controlling arm 406 projects laterally from the clutch and is normally held in clutch disengaged position by one or the other of a pair of abutment members 407 on a clutch controlling slide 408 which is shiftable rightwardly in FIG. 10 to release the clutch arm 406 with resultant engagement of the clutch. Upstanding posts 409 are secured in the top wall 375 of the transmission housing and are received in slots in the clutch control slide member 408 to guide the latter.

Figure 8:
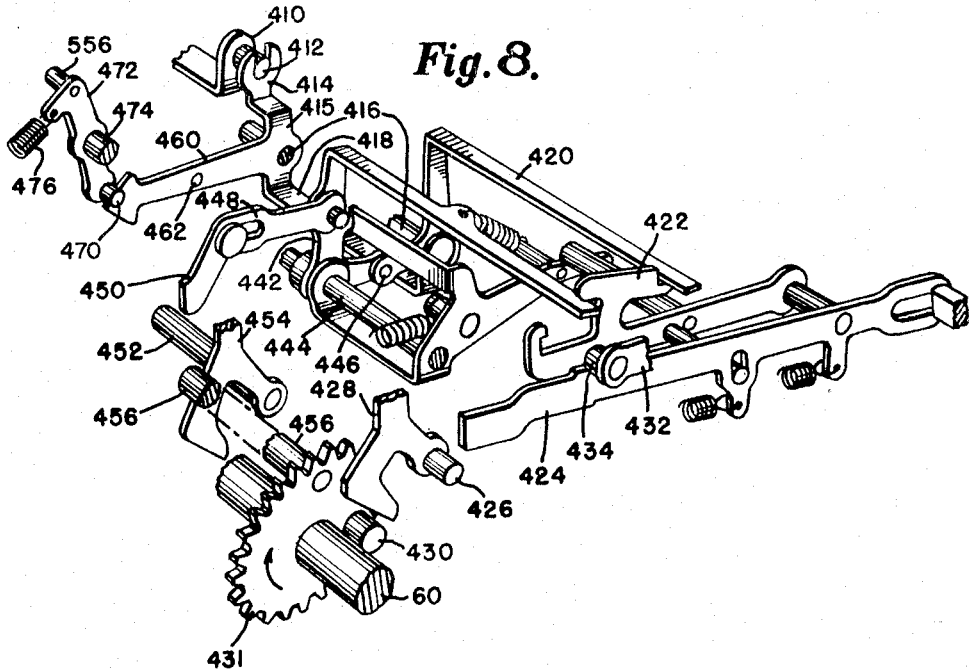
FIG. 8 is a perspective view of certain points of the power transmission.
Figure 7:
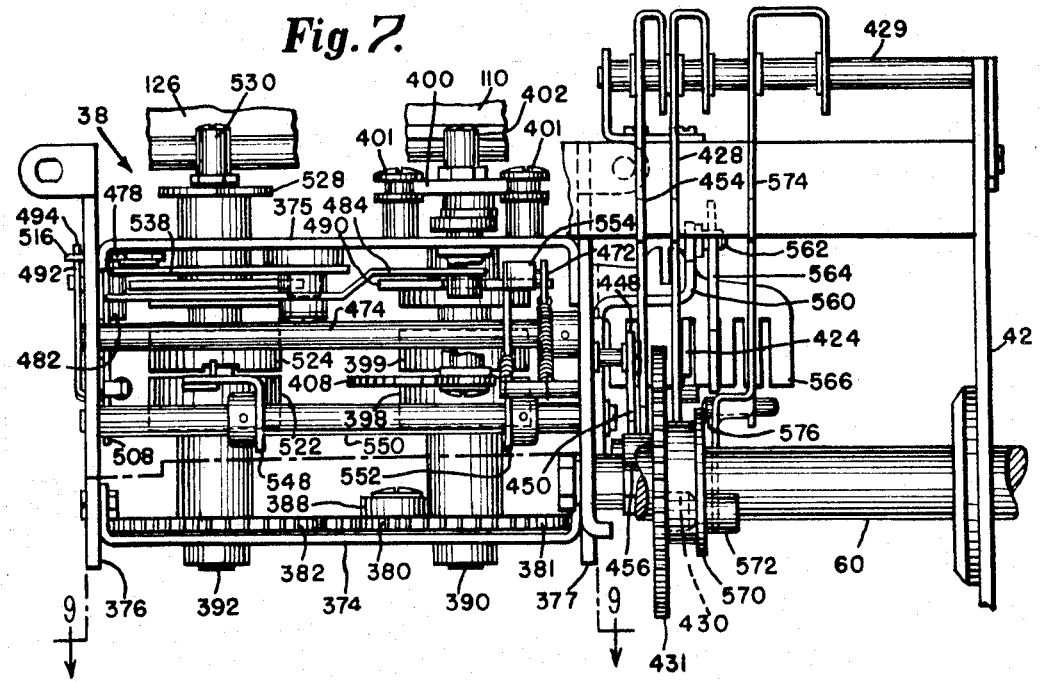
FIG. 7 is an elevational view, taken in the direction of the arrows 7—7 of FIG. 5.
Figure 13:
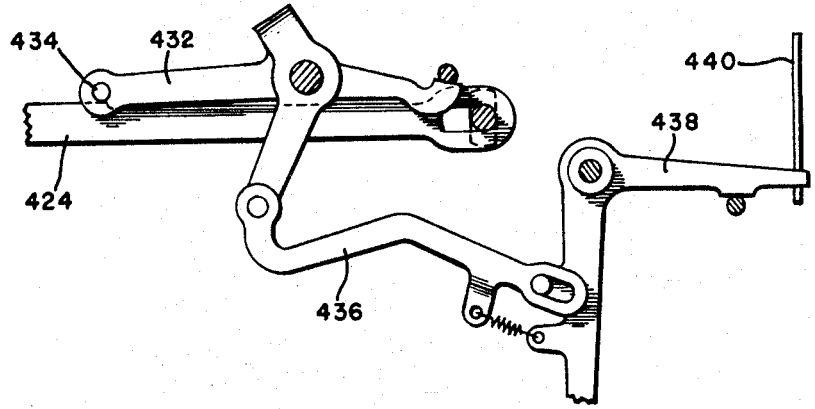
FIG. 13 is a side elevation of certain other details of the mechanism.

The clutch control slide member 408 has a laterally directed extension arm 410 with an upturned end portion in which a stud 412 is secured and received by a forked end of an arm 414 of a shifter lever 415 which is rotatable on a stud 416 fixed in side wall 377. It will be seen by reference to FIG. 10 that rotation of the lever arm 414 in a clockwise direction will move the slide member 408 to the right whereby to release the clutch control arm 406. The lever arm 414 has a lateral extension or bail 418 which has an upwardly offset end portion 420 that positions adjacent to and rearwardly of a pawl 422, FIG. 8. A slide member 424 is mounted to slide transversely to the axis of the camshaft 60 and carries the pawl 422 laterally thereof, the forward end of the slide member 424 being just rearwardly of a stud 426 carried by the lower free end of a pivotal striker arm 428. The arm 428 is pivotally mounted near its upper end on a shaft 429, FIGS. 6 and 7, and is pivotal toward the adjacent end of the slide member 424 when the lever is struck by a pin 430 which is secured to and projects from one side of a gear 431, the gear being affixed onto the camshaft 60. Normally, the free end of the slide member 424 is in a raised position to which it is biased and in which position it is out of striking range of the stud 426 for those cycling operations of the machine following which opening of the platen 86 is not desired. In order to pivot slide 424 to position its free end to be struck by the stud 426, a lever 432 is provided above the slide 424 and carries a stud 434 which engages the upper edge of the slide, as shown in FIGS. 8 and 13, such that the free end of the slide may be depressed by rotating lever 432 counterclockwise. The lever 432 is connected by a link 436 to a second lever 438 at the rear of the carriage, and carried by the lever 438 is an extension member 440 positioned to sense one of the pins 130 in the last columnar position of the carriage. When this occurs, the free end of slide 424 will be struck by the stud 430 and shifted rearwardly which will rotate the shaft 416 and move the clutch control slide 408 forwardly whereupon the clutch will become engaged to effect retraction of the platen 86 to open throat position.

A bail type lever 442 is pivotally mounted adjacent the lever 414 on a shaft 444 and the levers have arms pivotally connected together by a pin 446 and slot connection such that pivotal movement of either of the arms in one direction causes the other arm to pivot in the opposite direction. Carried by the lever 442 there is a link 448 having a free end 450, which positions rearwardly of the path of travel of a stud 452 which is secured to and projects laterally from the lower free end of a striker arm 454. A stud 456, secured in and to the rear 432, strikes and pivots the arm 454 each cycling of the cam shaft 60 and if the platen 86 is in open position, the link 448 will be driven rearwardly which will rotate shaft 416 and through lever 414 will move the clutch controlling slide member 404 to effect clutch engagement. The stud 456 is positioned such that it will strike arm 354 near the start of the camshaft cycle so as to effect the carriage closing operation prior to the operation of the print hammers 48.

*Automatic opening of the carriage*

In FIG. 10, the parts of the mechanism are in the positions they assume when the carriage platen 86 is in closed or printing position. Assume that the operation of the machine is programmed for posting operations. This means that in the columnar positions of the carriage there would be a pin 130, FIGS. 1 and 2, in only the last columnar position. Accordingly, with the exception of the last columnar position, the slide 424, FIG. 8, will remain in its ineffective position, or position in which it will not be engaaged by the stud 426 of striker arm 428, consequently preventing operation of the carriage open and close clutch. However, when the carriage tabulates to the last columnar position, a pin 130, in the control program device 128, causes stud 434, FIG. 8, to depress the forward end of slide 424 in position to be struck by stud 426 which, on cycling of the machine moves the slide 424 rearwardly. The laterally positioned pawl 422, carried by the slide 424, engages and pivots the bail 420 which is connected to rotate the shaft 416, FIG. 10, to move the clutch controlling slide 408 forwardly thereby to effect movement of the carriage platen 86 to open throat position. Also, the bail 420 pivots bail 442, to move link 448 forwardly in the path of movement of the stud 452 of arm 454.

*Automatic closing of the carriage*

As described above, each time the clutch control slide 404 is moved rearwardly to cause the platen to be opened, the lever 442 is rocked counterclockwise and moves link 448 forwardly in the path of movement of the stud 452 of the striker arm 454. The arm 454 is engaged and pivoted counterclockwise by the stud 456 which is carried by the gear 431 which is affixed to the camshaft 60, the stud 456 being positioned such that at the beginning of each cycle of operation of the camshaft, the stud 452 will push the link 448 to its rearward position and rock the bell crank 442 clockwise and the bell crank 420 and member 414 counterclockwise to move the clutch control slide 404 forwardly to cause the platen 86 to move to closed or printing position. Preferably, the timing of the platen closing operation is such that it occurs before the printing hammers are operated in the cycle of machine operations.

A forwardly extending arm 460 of the lever 414 carries a stud 462 which is engaged by the double V-notched edge of a detent arm 464, pivoted at its upper end on a pin 466 which is secured in and to the housing side wall 377, FIG. 10. A spring 468 urges the detent arm 464 counterclockwise against the detent pin 462. The free or forward end of the lever arm 460 abuts a stud 470 which is secured to and projects laternally of one arm of a lever 472. The lever 472 is secured onto a shaft 474 which is journaled for rotation in the opposite side walls 376 and 377 of the transmission housing 373. A coil spring 476, connected to an arm of lever 472, urges the lever and shaft 474 to rotate in a counterclockwise direction. A slide member 478 is mounted on the underside of the housing top wall 375 in which depending pins 480 are fixed and received in guide slots 482 provided in the slide member near the opposite ends thereof. Secured to and depending from the slide member 478 there is an abutment pin 483 in engagement with an arm 484 of a lever 486 which is pivoted, as at 487, on the underside of the housing top wall 375. Carried by another arm of the lever 486 there is a roller type detent member 488 which is adapted to engage in one or the other of a pair of diametrically positioned V-notches in the periphery of a disc 490 which is secured to the upper end of the clutch member 399 for rotation therewith. The pair of V-notches are, of course, indicative of the well known one-half revolution clutch.

Figure 12:
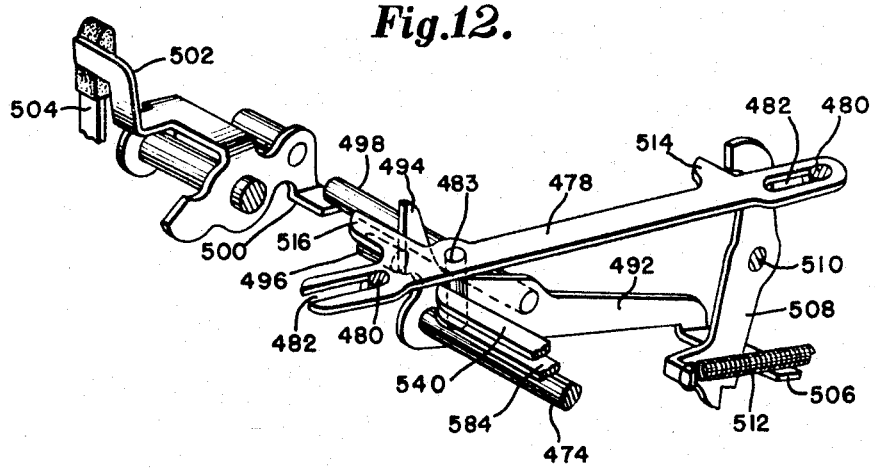
FIG. 12 is a perspective view of certain details.

A lever 492 is affixed to the rotatable shaft 474 adjacent the slide member 478 and has an upwardly directed arm 494 to engage a stop pin 496, FIG. 12, which is secured in and to the housing side wall 376. The lever 492 is normally yieldingly held against the pin 496 by the coil spring 476, FIG. 10, connected to lever 472. The lever 492 carries a stud 498 to engage a lug 500 of a lever 502 which in turn engages and operates a switch operating arm 504, FIG. 12, to releasably hold a switch member 503 closed, FIG. 14. As shown and described in detail in the Butler patent, the arm 504 is provided to keep the machine cycling motor 62 operating after the normal 360° cycling operation of the cam shaft 60 so as to employ said motor for the opening operation of the platen 86 and/or for line spacing operation of the platen, as may be required by the machine program.

On the lower rear end of the lever 492 there is a lug 506 which extends through an opening in the housing side wall 376 and cooperates with the lower shouldered end of a latch lever 508. The latch lever 508, FIG. 10, is pivoted, as at 510, to the housing side wall 376 and is biased counterclockwise, as viewed in FIG. 12, by a spring 512. When the lever 492 is moved to engage the switch operating arm 504 to hold the motor switch closed, the lug 506 is lowered below the shoulder on the latch lever 508 which is thereupon rocked counterclockwise by the spring 512 to latch the lever 492 in switch closed position. The slide member 478 has two laterally directed extensions 514 and 516 extending respectively in the path of the upper arm of the latch lever 508 and the upwardly directed projection 494 of the lever 492. When the slide 478 is moved rearwardly, the projection 514 engages the latch lever 508 and moves it away from the lug 506 before the projection 516 rocks the lever 492 far enough to lower the lug 506 before the latching shoulder on the lever 508.

From the above, it will now be understood that each time the clutch 397, FIG. 10, is activated by the shifting of its control slide 408, the platen operating slide 400 will be actuated and through bail 110 will move the platen 86 to its open position. At the same time, the arm 460, acting against the stud 470 and lever 472 will rotate the shaft 474 and levers 492 and 502 counterclockwise, FIGS. 10 and 12, to engage and hold the switch 64, FIG. 14, in closed position and the latch lever 508 in latched position. Soon after the extension 494 of lever 492 is moved away from the cooperating extension 516 of the slide member 478, the upper driven clutch member, FIG. 10, begins to rotate which forces the detent 488 out of the disc notch and pivots lever 486 which, acting against the slide pin 483, moves the slide member 478 rearwardly. This releases the latch lever 508 and transfers the motor switch holding function to the lever 486.

The transmission 48 includes mechanism for operating the bail 126, FIG. 11, to effect line spacing of the platen 86 and the mechanism comprises a one revolution clutch 520 having a lower driving component 522 and an upper driven compartment 524. The driving component 522 of the clutch has a hub which is integral with the gear 382 and receives the vertical shaft 392 which is journaled for rotation in the housing bottom wall 374 and extends upwardly through the upper clutch component 524 and the top wall 375 of the transmission housing. Secured to the upper end of the shaft 392 there is an arm 528 in which an abutment pin or stud 530 is secured in position to engage and operate the line spacing bail 126.

Within the transmission housing 48 a disc 532 surrounds the shaft 392 and is rigidly secured onto the upper end of the clutch component 524, the disc having a V-notch in its edge to receive a detent 534, carried by an arm 536 of a bell crank 538. The bell crank 538 is pivotally mounted on the vertical shaft 487 and has an arm 540 which, near its free end, is in abutting relation with the pin 483 of the slide member 478. A spring 542 is provided for yieldingly holding the detent 534 in the V-notch of the disc 532. A clutch control arm 544 projects laterally from the clutch 520 and is releasable to effect clutch engagement, but is normally held ineffective by a lug 546 on an arm 548 which is secured to a rotatable shaft 550. The shaft 550 extends parallel to the shaft 474 and is journaled for rotation in the opposite side walls 376 and 377 of the transmission housing. Affixed to the shaft 550 there is an arm 552 provided with a laterally disposed lug 554 in engagement with a stud 556 carried by and secured to the arm 472. A spring 558 is provided to return arm 552 to the position shown in FIG. 11. Another arm 560 is secured to the shaft 550 outwardly of housing side wall 377 and carries a laterally extending pin 562 for abutment by an upwardly directed extension 564 of a slide member 566, FIGS. 6 and 11. When the slide member 566 is moved to the right, the extension 564 acting against pin 562 will rotate the shaft 550 clockwise whereby lug 554 acting against the stud 556 will pivot the shaft 474 clockwise. The pivoting of the shaft 550 clockwise will move lug 546 away from the clutch control arm 544 and the clutch will engage and drive the shaft 526 through one revolution when lug 546 will again be in position to stop and hold the arm 544 in declutched position. During the one revolution of the shaft 526 the stud 530 revolves against the bail 126 to effect line spacing by the platen 86, the shaft 474 is rotated clockwise to retract arm 492 and position lever 508 in latch position, and stud 534 rides out of its V-notch to pivot bell crank 538 to move the slide 478 rightwardly.

Affixed onto the camshaft 60, FIG. 6, there is an arm 570 carrying a striker pin 572 to engage and pivot a striker arm 574 which is pivoted on and depends from the shaft 429. The arm 574 carries a striker pin 576 which is provided to strike the adjacent end of the slide 566 and move it rightwardly to effect the line spacing operation of platen 86. As illustrated, the end of the slide 566, adjacent the striker pin 576, is normally above the striker pin 576, for those cycling operations of the camshaft 60, that do not require line spacing, for example, during posting operations lever 578 is affixed to a rotatable shaft 580 and has a free end which carries a stud 582 in engagement with the upper edge of the slide 566 to depress the forward end thereof into the path of the striker pin 576. Also affixed to the shaft 580 is a lever 584 having a lower end which carries a stud in abutment with an upwardly directed extension 586 of a link 588. One end of the link 588 has a slot and pin connection 590 to an arm of a bell crank 592, the other arm of which carries a pin 594 to sense a program pin 130, calling for a line spacing operation. The other end of the link 588 is supported by a pivotal arm 596 connected thereto by a pin and slot connection 588. A spring 600 yieldingly connects the lever 584 to the link 588.

In accordance with my invention, I provide a control system for controlling operation of the perforator 270 in accordance with operation of the platen 86 between its printing and retracted positions so as to effect a single perforator operation for each line of printing irrespective of repeated cycles of operation of the machine during posting. To accomplish this in an efficient, inexpensive manner, the switch device 290 includes a settable, bistable control or switch member 604 to control operation of the perforator 270, the switch member, as illustrated diagrammatically in FIG. 14, preferably being of the overcenter or toggle type, having a pair of arms including the switch member 604 and an arm 606 fulcrumed on opposite sides of a base 608 and connected by an overcenter coil spring 610. A contact member 612 is carried by the arm 604 for cooperation with a stationary contact member 614 to control operation of the solenoid 282. Arm 606 is the operating arm of the toggle switch and is movable from the position shown overcenter to move and set the contact member 612 in engagement with the stationary contact member 614.

Figure 14:
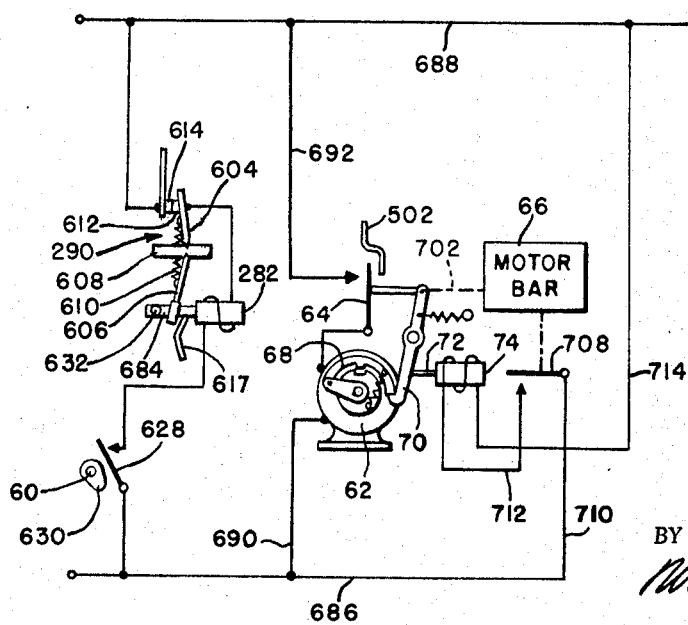
FIG. 14 is a diagrammatical illustration of a control system for the machine and for the perforator.

The switch member 604 is movable to closed position by the cyclically operable drive means or motor 62 under the control of a program pin 130 calling for either a platen retraction function and/or a program pin calling for a platen vertical spacing function. To close the switch member 604, a switch actuator or lever 615 is provided, the lever being pivoted on a pin or stub shaft 616 to one of the frame side plates 80, outwardly thereof. The lever 615 has an upwardly directed arm 617 extending behind the switch operating arm 606 in position to engage and move the arm overcenter to close the switch contacts. A lower depending arm 618 of lever 615 carries an abutment member 620, preferably a roller, in the path of movement of the upper end 96 of lever 95 which rotates clockwise into engagement with the roller 620 and pivots lever 615 counterclockwise as the platen is retracted. At its lower end, the lever 615 is provided with an ear 622 in the path of travel of the vertical spacing bail 126 which, in operation, swings counterclockwise into engagement with ear 622 to pivot lever 615 counterclockwise so as to close switch member 604. A coil spring 624 has one end attached to the upper arm of lever 615 and the other end anchored by a bracket 625 to the carriage side plate 80 to return the lever to a stop member 626 on the side plate. With reference to FIG. 14, a timer switch 628 of the pulsing type is provided and is connected in series with the solenoid 282 and the solenoid switch contacts 612, 614, the switch 628 being normally open and closable by a cam 630 on the cyclically operable cam shaft 60. Preferably the timing is such that switch 628 closes just about the time that the platen reaches closed or printing position.

In order to assure that the perforator solenoid will be energized only on a cycle of machine operation following either a platen retraction cycle or vertical spacing cycle of operation, I provide a switch actuator 632 to move the settable switch contact member 604 to its ineffective or open position. The actuator 632 moves with the perforator and is carried by the solenoid core 284, the actuator thus being electrically operated under control of the solenoid switch contact member 612. Preferably, the actuator 632 is in the form of an abutment member or stud, secured to and projecting laterally from the core 284 on the other side of the switch operating arm 606 from the lever arm 615. The actuator 632 may be a projection of the pin which connects the extension 283 to the solenoid core 284.

Operation

With reference particularly to FIG. 2, the operating parts are shown in the positions they assume when the platen 86 is in printing position, engaging its pressure rollers 88. In this position of the platen 86, it will be noted that the switch member 604 is in open position. As a consequence, the perforator 270 is rendered inactive and will remain inactive so long as the platen remains in printing position, or during a line of posting operations. When the platen carriage returns to its starting position or column 1, a program pin in this position causes the platen 86 to be operatively connected to the motor 62 by the transmission clutch 397. When this occurs, the slide 400 is moved forwardly, or to the left, facing FIG. 2 which rocks the bail 110 clockwise to rotate the shaft 94 and arm 95 clockwise. Rotation of the arm 95 clockwise, rotates arm 100, shaft 102 and cam 104 counterclockwise which pivots the platen carrying arms 90 clockwise, thus moving the platen 86 to the retracted position shown in FIG. 1. Toward the end of the retracting operation of the platen 86, the upper end of lever arm 96 strikes the roller 620 and pivots lever 615 counterclockwise about its fulcrum 616, the upper end of the lever engaging the lower toggle arm 606 and, moving its overcenter, closes the switch contacts 612, 614, FIGS. 4 and 14. The retraction of the platen 86 and closing of the switch member 604 occurs during the engagement of the clutch 397 which soon thereafter automatically disengages as herein described. The platen 86 remains in the retracted position for the insertion of another record sheet into the sheet guideway 260 and the switch member 604 remains closed until the next cycle of operation of the machine.

When the next record sheet has been inserted in the guideway in print receiving position, a cycle of operation is initiated by the depression of the motor bar 66, FIG. 14. Upon depression of the motor bar 66, the block solenoid 74 is energized and motor switch 64 is closed to effect a cycle of operation of the machine and the clutch 397 is engaged to connect the motor 62, through the transmission 38 to the platen operating bail to move the platen forward to printing position. This allows the spring 624 to pivot the switch operating lever 615, FIG. 2, clockwise to its stop member 626. During the machine cycle, the timer switch 628 is closed by the cam 630 on the main camshaft 60, FIG. 14, and since the solenoid switch member 604 is closed, the solenoid 282 is energized and actuates the perforator 270 to perforate the sheet as an indication of the last line of print thereon. When the solenoid 282 is energized to operate the perforator, the solenoid armature 284 is moved to the right, facing FIG. 2, and the switch actuator or pin 632 strikes the switch toggle arms 606 and sets the switch in open position. The switch member 604 will remain in this ineffective position until the platen 86 is again retracted and/or a vertical spacing operation is performed. During the time that the switch member 604 remains open, a line of posting operations may be performed without operation of the perforator since operation of the perforator requires mutual control by switch member 604 and the timer switch member 628.

When a program pin 130 calls for a vertical spacing of a sheet, this function is performed by a cycle of operation of the machine which may be initiated by depressing the motor bar 66. The cycling of the machine activates or trips the clutch 520, FIG. 11, which couples the cyclically operable motor 62 through the above described mechanism to the bail 126, FIG. 2, which then operates the pawl 116 to engage and rotate the platen ratchet wheel 114 to effect the spacing operation. To operate the pawl 116, the bail 126 pivots counterclockwise and, in addition to operating the pawl, strikes the lower ear 622, FIG. 3, of lever 615. This pivots the lever 615 counterclockwise and the upper end of the lever 615 strikes and pivots the settable switch member 604 to closed position. At the predetermined time in the cycle of operation, pulsing switch 628 is closed which energizes the solenoid 282 to operate the marker or sheet perforator 270 and, at about the same time, the actuator or pin 632 strikes and moves the settable switch member 604 to its open position shown in FIG. 2.

What is claimed is:

1. In a cyclically operable accounting machine, supporting means, a platen mounted on said supporting means for movement between a retracted record sheet receiving position and a printing position, means operable to move said platen between said positions, a sheet marker operable to mark a sheet to designate a line of printing thereon, and a control member operatively connected to said marker to control actuation thereof and to said operable means for actuation by the latter, said control member movable by said operable means to an effective position on movement of said platen to said sheet receiving position and movable by said marker to an ineffective position on movement of the platen to printing position.

2. In a cyclically operable accounting machine, supporting means, a platen mounted on said supporting means for movement between a retracted record sheet receiving position and a printing position, means operable to move said platen between said positions, a sheet marker operable to mark a sheet to designate a line of printing thereon, a control member operatively connected to and controlling operation of said marker, said control member movable to an effective position by said operable means when the latter moves said platen to the sheet receiving position and an abutment member movable with said marker and operable to move said control member to an ineffective position on movement of said platen to the printing position by said operable means.

3. In a cyclically operable accounting machine, supporting means, a movable platen mounted on said supporting means and having a retracted sheet receiving position and a printing position, means operable to move said platen between said positions, an electrically operated sheet marker operable to mark a sheet as an indication of a line of printing on the sheet, said marker movable on activation thereof from an inactive position to a marking position and return, a settable switch member operatively connected to said marker and settable in closed position by said platen operable means on movement of said platen to the retracted position, cyclically operable drive means, a pulsing switch operated by said drive means each cycle of operation thereof and operatively connected to said settable switch means to activate said marker, and an actuator movable with said marker and operable to set said settable switch member in open position on actuation of said marker.

4. In a cyclically operable accounting machine having printing means, supporting means, cyclically operable means to operate the printing means, a movable platen mounted on said supporting means and having a retracted record sheet receiving position and having a printing position, means operable to move said platen between said positions, an electrically operated sheet marker having a normally inactive position and movable to mark a sheet to designate a line of printing thereon, a settable switch member operatively connected to said marker and settable to a closed position by said platen operable means on movement of said platen to the retracted position thereof, cyclically operable drive means, a normally open timer switch member connected in circuit with said settable switch member and actuated by said cyclically operable drive means to effect an electrical pulse when said settable switch member is in closed position, and a switch actuator movable with said marker and operable to move said settable switch member to open position on return of said marker to the inactive position thereof.

5. In a cyclically operable accounting machine, supporting means, a movable platen mounted on said supporting means and having a record sheet receiving position and a printing position, means operable to move said platen between said positions, cyclically operable means, an electrically operated marker operable to mark a sheet to designate a line of printing thereon, a pulsing switch member operatively connected to said marker and actuated by said cyclically operable means, a settable switch member connected in circuit with said pulsing switch member and cooperating therewith to mutually control operation of said marker, said marker on activation thereof moving to mark a sheet and returning to inactive position, a lever movable with said platen between positions corresponding respectively to platen retracted and printing position and operable to set said settable switch in closed position on movement of said platen to retracted position, and an abutment member movable with said marker and operable to set said settable switch in open position upon marking operation of said marker.

6. In an accounting machine, supporting means, a platen movable from a retracted record sheet receiving position to a record sheet printing position, cyclically operable means to move the platen between the sheet receiving and printing positions, means operable to couple said platen to said cyclically operable means, a program element representative of a platen retraction function and operatively connected to and controlling operation of said coupling means to effect a retraction of said platen, an electrically operated sheet marker operable on activation thereof to mark a sheet as an indication of a last line of print thereon, a settable switch member operatively connected to said marker and settable in closed position by said cyclically operable means on retraction of said platen by said cyclically operable means, a timer switch member in circuit with said settable switch and closed and opened by said cyclically operable means during the next cycle of operation thereof to first activate and then deactivate said electrically operated marker, and a switch member actuator movable with said marker and on deactivation of the latter operable to engage and set said settable switch member in open position.

7. In an accounting machine printer having a platen operation with reference to a print line and having a marker operable to mark a record sheet as an indication of a line of print on the record sheet, a control system for the marker comprising cyclically operable means to effect the platen operation, a marker actuator, a settable control member operatively connected to said marker actuator to control operation of the latter, said settable control member movable between effective and ineffective positions, a control member actuator connectable to and operated by said cyclically operable means to effect the platen operation, said control member actuator operable to move said settable control member to the effective position thereof, a timed control member actuated by said cyclically operable means and cooperable with said settable control member to mutually control operation of said marker actuator, and an actuator movable with said marker actuator to engage and set said settable control member in the ineffective position threof.

8. In an accounting machine of the character defined by claim 7 wherein the platen operation is a retraction operation of the platen.

9. In an accounting machine of the character defined by claim 7 wherein the platen operation is a rotation of the platen to effect a spacing of a record sheet by the platen.

10. In an accounting machine of the character defined by claim 7 wherein the marker actuator is an electrically operated actuator and the settable control member and the timed control member are switch members.

References Cited by the Examiner
UNITED STATES PATENTS 2,615,623  10/1952  Pitman _____ 255—60.13

RICHARD B. WILKINSON, *Primary Examiner.*

LEO SMILOW, *Examiner.*